(12) United States Patent
Plougsgaard et al.

(10) Patent No.: US 11,965,532 B2
(45) Date of Patent: Apr. 23, 2024

(54) VALVE ARRANGEMENT AND VALVE GROUP

(71) Applicant: Danfoss Power Solutions ApS, Nordborg (DK)

(72) Inventors: Helge Søe Plougsgaard, Nordborg (DK); Dirk Wroblewski, Nordborg (DK); Martin Jørgensen, Nordborg (DK)

(73) Assignee: DANFOSS POWER SOLUTIONS APS, Nordborg (DK)

( * ) Notice: Subject to any disclaimer, the term of this patent is extended or adjusted under 35 U.S.C. 154(b) by 150 days.

(21) Appl. No.: 17/782,719

(22) PCT Filed: Dec. 18, 2020

(86) PCT No.: PCT/EP2020/087070
§ 371 (c)(1),
(2) Date: Jun. 6, 2022

(87) PCT Pub. No.: WO2021/136691
PCT Pub. Date: Jul. 8, 2021

(65) Prior Publication Data
US 2023/0023143 A1   Jan. 26, 2023

(30) Foreign Application Priority Data
Dec. 30, 2019 (EP) ..................................... 19219985

(51) Int. Cl.
*F15B 13/08* (2006.01)
*F16K 11/07* (2006.01)

(52) U.S. Cl.
CPC .......... *F15B 13/0832* (2013.01); *F16K 11/07* (2013.01); *F15B 2211/30565* (2013.01)

(58) Field of Classification Search
CPC .............. F15B 13/0832; F15B 13/0817; F15B 13/0871; F15B 13/0882; F15B 13/0896;
(Continued)

(56) References Cited

U.S. PATENT DOCUMENTS

| 4,696,198 A * | 9/1987 | Komatsu .................. B62D 5/08 180/441 |
| 2019/0003497 A1* | 1/2019 | Hori ........................ F15B 11/10 |

(Continued)

FOREIGN PATENT DOCUMENTS

| DE | 102 13 397 A1 | 10/2003 |
| EP | 1 008 764 A1 | 6/2000 |

(Continued)

OTHER PUBLICATIONS

International Search Report dated Mar. 11, 2021, in connection with corresponding International Application No. PCT/EP2020/087070; 3 pages.

*Primary Examiner* — Patrick C Williams
(74) *Attorney, Agent, or Firm* — McCormick, Paulding & Huber PLLC

(57) ABSTRACT

A valve arrangement includes a housing arrangement (12), (18), a first spool valve (1a, 1b) having a first spool (3a, 3b) and a second spool valve (2a, 2b) having a second spool (4a, 4b), wherein the first spool valve (1a, 1b) and the second spool valve (2a, 2b) each includes a supply channel arrangement having a pump channel (5) and a tank channel (6), and a working port arrangement having two working ports (8, 9), wherein the spools (3a, 3b; 4a, 4b) control a flow path between the supply channel arrangement (5, 6) and the working port arrangements (7, 8). In such a valve arrangement, it should be possible to simply adapt the control behaviour to different purposes. To this end, the working (Continued)

port arrangement (7, 8) is arranged in a flange (16*a*, 16*b*) connected to the housing arrangement (13, 14; 19, 20).

7 Claims, 1 Drawing Sheet

(58) Field of Classification Search
CPC ........ F15B 13/0839; F15B 2211/30565; F15B 2211/3057; F15B 2013/006; F16K 11/07
See application file for complete search history.

(56) References Cited

U.S. PATENT DOCUMENTS

2019/0162324 A1\* 5/2019 Tanaka .................... F16K 11/24
2020/0208746 A1\* 7/2020 Miyamoto ............... F16K 11/07

FOREIGN PATENT DOCUMENTS

| EP | 1 035 331 A2 | 9/2000 | |
| JP | 2017219178 A \* | 12/2017 | .......... F15B 13/0402 |
| WO | 2017/017650 A1 | 2/2017 | |

\* cited by examiner

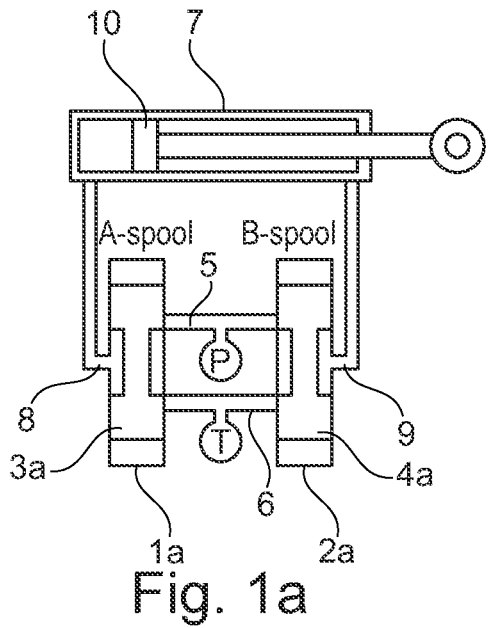 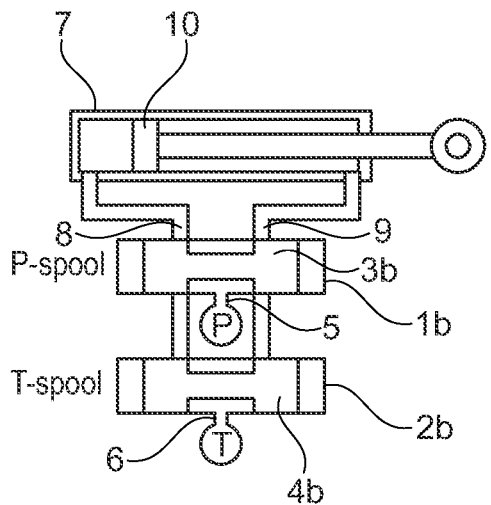
Fig. 1a       Fig. 1b
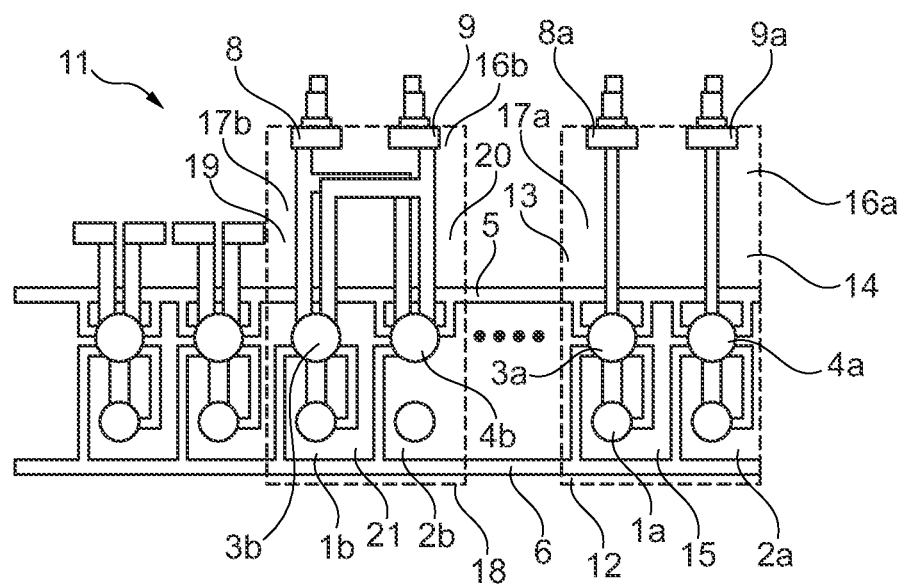
Fig. 2

VALVE ARRANGEMENT AND VALVE GROUP

CROSS-REFERENCE TO RELATED APPLICATION

This application is a National Stage application of International Patent Application No. PCT/EP2020/087070, filed on Dec. 18, 2020, which claims priority to European Application No. 19219985.9, filed Dec. 30, 2019, each of which is hereby incorporated by reference in its entirety.

TECHNICAL FIELD

The present invention relates to a valve arrangement comprising a housing arrangement, a first spool valve having a first spool and a second spool valve having a second spool, wherein the first spool valve and the second spool valve each comprise a supply channel arrangement having a pump channel and a tank channel, and a working port arrangement having two working ports, wherein the spools control flow paths between the supply channel arrangements and the working portarrangements.

BACKGROUND

Such a valve arrangement is used for controlling the flow of hydraulic fluid from a pressure source to a hydraulic actuator and back from the hydraulic actuator to tank or another low pressure area. To this end the working port arrangement is connected to the hydraulic actuator and the supply channel arrangement is connected to a pressure source and to tank.

The use of two spool valves allow the control not only of the hydraulic fluid from the pressure source to the actuator, but also the control of the flow back from the actuator to the tank. This gives a better control of the behaviour of the actuator.

SUMMARY

The object underlying the invention is to provide a simple possibility for adapting the valve arrangement to different control behaviours.

This object is solved in that the working port arrangement is arranged in a flange connected to the housing arrangement.

In this way different flanges can be used to establish different connections between the spool of each spool valve to the working port. If another control behaviour is desired, the flange can simply be exchanged.

In an embodiment of the invention the housing arrangement comprises a first housing of the first spool valve and a second housing of the second spool valve, wherein the flange is connected to the first housing and to the second housing. The spool valves can be in form of slices which are stacked together. A pair of such slices forms a valve arrangement having a common flange to connect the respective spools to the working port arrangement.

In an embodiment of the invention the flange is one of two types of flanges, wherein a first type of flange connects the first spool to one working port and to the supply port arrangement and connects the second spool to the other working port and to the supply port arrangement, wherein a second type of flange connects the first spool to both working ports and to the pump channel and connects the second spool to both working ports and to the tank channel.

Accordingly, by replacing the flange of the first type by a flange of the second type or vice versa it is possible to adapt the control behaviour of the valve arrangement to different purposes.

In an embodiment of the invention the spools have a moving direction and the flange is mounted to a face of the housing arrangement which face is parallel to the moving direction. In this case the flange can be mounted and demounted without affecting the moving possibilities of the spool.

The invention relates as well to a valve arrangement having a valve as described before, in that one of the valve arrangement comprises a flange of the first type and another one of the valve arrangements comprises a flange of the second type.

Accordingly, it is possible to mix different control behaviours in one valve group.

In an embodiment of the invention the housing arrangements contact each other at the contact face and the flanges are arranged at a mounting face perpendicular to the contact face. In this case it is possible to exchange the flange even when the housing arrangements are stacked together.

BRIEF DESCRIPTION OF THE DRAWINGS

An embodiment of the invention will now be described in more detail with reference to the drawing, wherein:

FIGS. 1a and 1b show two different possibilities to control an actuator by means of two spool valves and FIG. 2 shows a valve group having two valves with different control behaviours.

DETAILED DESCRIPTION

FIG. 1 schematically shows a valve arrangement having a first spool valve 1a and a second spool valve 2a. The first spool valve 1a comprises a first spool 3a and the second spool valve 2a comprises a second spool 4a. In a way not shown, the first spool valve 3a comprises a first housing and the second spool valve 2a comprises a second housing.

A supply channel arrangement is provided having a pump channel 5 connected to a pressure source P, for example a pump, and a tank channel 6 connected to a tank T or any other pressure sink.

The two spool valves 1a, 2a are connected to a hydraulic actuator 7. To this end the spool arrangement of the first spool valve 1a and the second spool valve 2a comprises a working port arrangement having a first working port 8 and a second working port 9. The two working ports 8, 9 are connected to fluid connectors of the actuator 7.

In the first type of the valve arrangement shown in FIG. 1a the first spool 3a of the first spool valve 1a controls a flow of hydraulic fluid between the supply channel arrangement 5, 6 and the first working port 8 and the second spool 4a of the second spool valve 2a controls the flow of hydraulic fluid between the supply channel arrangement 5, 6 and the second working port 9.

When, for example, the first spool 3a controls a connection between the supply channel 5 and the working port 8 and the second spool 4a controls a connection between the second working port 9 and the tank channel 6, it is possible to control the behaviour of the hydraulic actuator 7, for example the movement of a piston 10 in the actuator 7 which can be, for example, of advantage when the actuator 7 is used to raise and lower a load.

The use of the spool valves 1a, 2a in this arrangement allows, however, for the possibility to supply both working ports 8, 9 with pressure from the supply channel 5. To this end the two spools 3a, 4a must establish a connection between the supply channel 5 and each of the working ports 8, 9. In this way it is possible to hydraulically clamp the piston 10 within the actuator 7.

In a similar way it is possible to connect both working ports 8, 9 by means of the two spools 3a, 4a to the tank channel 6 to allow for a floating of the piston 10 in the actuator 7.

FIG. 1b shows a different arrangement using however the same spool valves 1b, 2b. Same elements are denoted with the same reference numerals as in FIG. 1a, however with an index "b" instead of "a".

In the arrangement shown in FIG. 1b the first spool 3b controls a flow of fluid from the supply channel 5 to one of the working ports 8, 9, whereas the second spool 4b controls a flow from one of the working ports 8, 9 to the tank channel 6.

To differ between the two arrangements, the spools 3a, 4a in the arrangement of FIG. 1a are termed "A-spool" and "B-spool", whereas in the arrangement of FIG. 1b the spools 3b, 4b are termed "P-spool" and "T-spool", respectively.

FIG. 2 shows a valve group 11 comprising a first valve arrangement 12 realizing the principle shown in FIG. 1a. The first valve arrangement 12 comprises a first spool valve 1a having spool 3a arranged in a first housing 13. Furthermore, the first valve arrangement comprises the second spool valve 2a having the second spool arranged in a second housing 14. Both housings contact each other at a contact face 15, i.e. the two housings 13, 14 are stacked.

The connection between the first spool 3a and the second spool 4a on the one hand and the two working ports 8, 9 on the other hand is made by a flange 16a which is mounted at a mounting face 17a perpendicular to the contact face 15.

The flange 16a is arranged parallel to a moving direction of the spools 3a, 4a. In this way it is possible to mount and demount the flange 16a to the first spool valve 1a and the second spool valve 2a, respectively, even when the first and second housings 13, 14 are stacked to each other.

FIG. 2 shows as well a second valve arrangement 18 showing the control principle of FIG. 1b.

The second valve arrangement 18 comprises a first housing 19 and a second housing 20 contact each other at a contact face 21. A flange 16b forms the connection between the first spool 3b and the second spool 4b on the one hand and the two working ports 8, 9 on the other hand. The flange 16b is connected to a mounting face 17b which is arranged perpendicular to the contact face 21 between the two housings 19, 20.

The first valve arrangement 12 and the second valve arrangement 18 are identical except the flanges 16a, 16b. In other words, the first housing 13 of the first valve arrangement 12 is identical to the first housing 19 of the second valve arrangement 18 and the second housing 14 of the first valve arrangement 12 is identical to the second housing 20 of the second valve arrangement 18. Depending on the construction of the housing 13, 14; 19, 20, it is possible that the first spools 3a, 3b and the second spools 4a, 4b, respectively differ from each other.

Channels in the housings 13, 14; 19, 20 can be closed by plugs if they are not needed.

Even if the housings 13, 14; 18, 19 are stacked together and fixed to each other, it is possible to exchange the flanges 16a, 16b to adapt the valve arrangements 12, 18 to the desired purpose.

While the present disclosure has been illustrated and described with respect to a particular embodiment thereof, it should be appreciated by those of ordinary skill in the art that various modifications to this disclosure may be made without departing from the spirit and scope of the present disclosure.

The invention claimed is:

1. A valve arrangement comprising
a housing arrangement,
a first spool valve having a first spool and
a second spool valve having a second spool,
wherein the first spool valve and the second spool valve each comprise a supply channel arrangement having a pump channel and a tank channel, and a working port arrangement having two working ports, wherein the spools control flow paths between the supply channel arrangements and the working port arrangements, wherein the working port arrangement is arranged in a flange connected to the housing arrangement, wherein the flange is one of two types of flanges, wherein a first type of flange connects the first spool to one working port and to the supply channel arrangement and connects the second spool to the other working port and to the supply channel arrangement, wherein a second type of flange connects the first spool to both working ports and to the pump channel and connects the second spool to both working ports and to the tank channel, wherein the flange of the first type is replaceable with a flange of the second type and vice versa.

2. The valve arrangement according to claim 1, wherein the housing arrangement comprises a first housing of the first spool valve and a second housing of the second spool valve, wherein the flange is connected to the first housing and to the second housing.

3. The valve arrangement according to claim 2, wherein the spools have a moving direction and the flange is mounted to a face of the housing arrangement which face is parallel to the moving direction.

4. A valve group comprising at least two valve arrangements according to claim 3, wherein one of the valve arrangements comprises a flange of the first type and another one of the valve arrangements comprises a flange of the second type.

5. The valve arrangement according to claim 1, wherein the spools have a moving direction and the flange is mounted to a face of the housing arrangement which face is parallel to the moving direction.

6. A valve group comprising at least two valve arrangements according to claim 1, wherein one of the valve arrangements comprises a flange of the first type and another one of the valve arrangements comprises a flange of the second type.

7. The valve group according to claim 6, wherein the housing arrangements contact each other at a contact face and the flanges are arranged at a mounting face perpendicular to the contact face.

* * * * *